W. H. St. JOHN.
Purification of Illuminating Gas.
No. 142,358. Patented September 2, 1873.
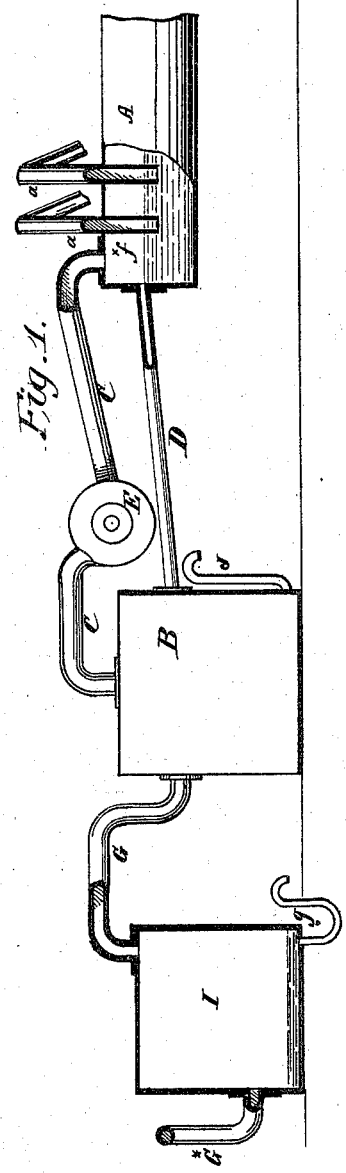
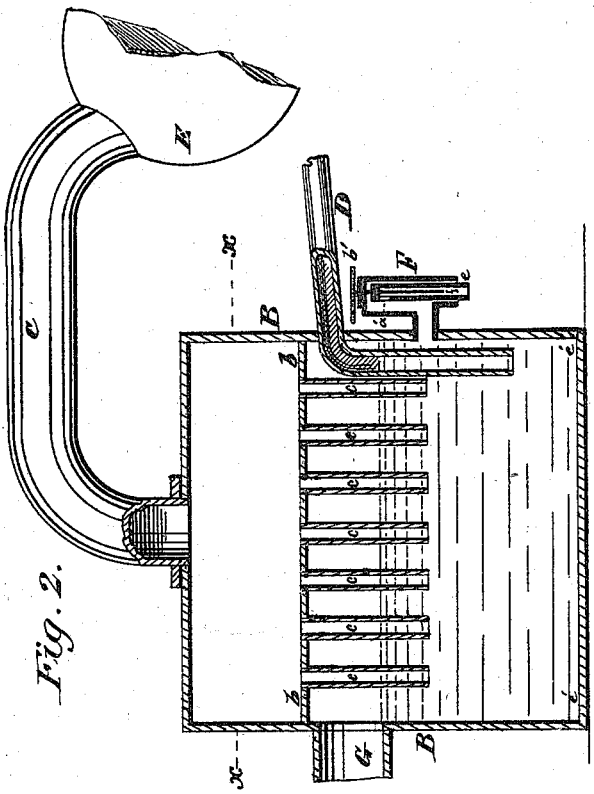
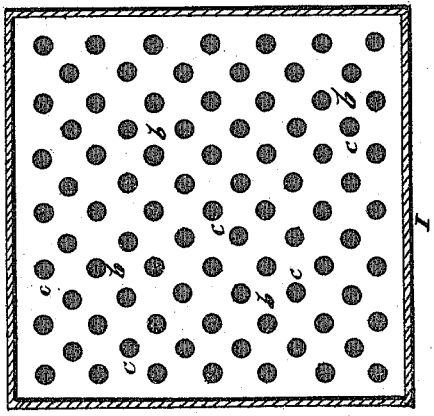
Witnesses,
James A Whitney
Wm Tunney
Inventor,
William H St John

UNITED STATES PATENT OFFICE.

WILLIAM H. ST. JOHN, OF NEW YORK, N. Y.

IMPROVEMENT IN THE PURIFICATION OF ILLUMINATING-GAS.

Specification forming part of Letters Patent No. 142,358, dated September 2, 1873; application filed July 25, 1873.

*To all whom it may concern:*

Be it known that I, WILLIAM H. ST. JOHN, of the city, county, and State of New York, have invented certain Improvements in the Purification of Illuminating-Gas, of which the following is a specification:

This invention relates to the purification of illuminating-gas produced by distillation from bituminous coal, oils, resin, and similar materials. It is designed to effect such purification without the use of any water whatever, other than that evolved from the coal or gas-producing substances while being distilled; to dispense wholly or for the most part with the necessity of the usual purification by means of lime or oxide of iron; and to secure practically a larger quantity of gas from a given weight of coal than is possible with the gas-making apparatus and operations heretofore in use.

To secure these results the invention consists in a novel process of purifying the gas, by causing it to come in intimate contact, in a chamber separate from the main, with the condensed products brought over from the retorts during distillation, the aqueous liquid absorbing the ammonia from the gas, and fixing the same by means of the acids held in the volume of the gas by the said liquid; the tar particles being meanwhile caused to agglomerate in the liquid, so that the purification of the gas is secured without washing or other expensive or deteriorating processes or operations. The invention also consists in a novel apparatus for carrying into effect the process just herein briefly set forth.

Figure 1 is a side view and partial vertical section of an apparatus constructed according to my invention, and designed for the practice of the process constituting part of the same. Fig. 2 is a vertical section on a larger scale of one portion of the apparatus. Fig. 3 is a horizontal section taken in the line $x$ $x$ of Fig. 2.

A is the ordinary hydraulic main, to which the gas is conducted from the retorts in the usual manner by the dip-pipes $a$; the main A, however, serving merely to seal the mouths of the dip-pipes, and as a reservoir from which the liquids condensed from vapors brought over with the gas may be conducted to the chamber or vessel B by means of the pipe D, placed at a slight inclination from the horizontal. The chamber B is divided horizontally by a partition, $b$, as represented in Fig. 2, in which are fixed a number of downwardly-extending dip-tubes, $c$, as also indicated in Fig. 3. The gas-space $*f$ of the main A communicates with the upper part of the chamber B by means of the pipe C, in which, intermediate between the main and the chamber, is the usual exhauster E, operated in any appropriate manner. The end of the pipe D which enters the main A is at such distance from the bottom of the latter as to insure the sealing of the lower extremities of the dip-pipes $a$. The opposite end of pipe D enters the chamber B below the partition $b$, and is extended downward nearly to the bottom $c'$. Attached to the lower part of the chamber B is a valve, F, as shown in Fig. 2. This valve F is simply to increase or reduce the seal of the dip-tubes at pleasure, it being adjustable. When such adjustment is not desired, the chamber may be furnished with a simple siphon, as shown at J, in Fig. 1. From that portion of the chamber B below the partition but above the highest level at which the liquid just mentioned is to be retained, extends a gas-conduit G, to a tank, I, from which a pipe, G*, extends to a gasometer, or, should there be an exceptional case when such may be desired, to a purifier of ordinary construction. This tank I is furnished with a siphon, $g$, to permit the outflow automatically of any liquid which may accumulate in the tank beyond a given depth. The retorts being put in operation, and the exhauster E being put in motion, the gas from the retorts passes through the dip-pipes $a$ to the main A, and thence to the upper compartment of the chamber B, the same power of the exhauster that insures the passage of the gas from the retorts forcing it into the aforesaid compartment with a pressure sufficient to force it down through the dip-tubes $c$, sealed by dipping in the liquid in the lower compartment of the chamber, as indicated in Fig. 2. This liquid comprises that produced or evolved from the coal or other gas-producing material in the retorts, and which, passing from the retorts in the state of vapor, is precipitated in the main A. This liquid consists of tar and water, and amounts to about twenty gallons per ton of coal distilled—a quantity sufficient to arrest all the tar and to absorb all the ammonia, sulphurous gases, &c., carried over with the gas to the chamber B, as hereinbefore explained. This liquid, as previously explained, passes from the main to the lower part of the chamber, and is there maintained, by means of the valve F, at such height as to seal to any desired extent the lower ends of the dip-tubes $c$. The gas is forced down the dip-tubes $c$ into and through the liquid in the lower part of the chamber. There it is brought into intimate contact with the said liquid. The ammonia is solved. The sulphurous and carbonic acids are eliminated by the liquid, owing to the intense power of the concentrated ammoniacal liquor as a reagent on these gases. The gas is therefore freed or purified from the deleterious ingredients named. Furthermore, the ammonia, being chemically a base, unites with the acids named to form ammoniacal salts, which, dissolved in the liquid, are fixed against liability of evolution during the subsequent passage of gas through the same. As the liquid from the main flows into the upper portion of this compartment of the chamber, the surplus lower down is displaced and flows out through the valve F. The tar is deposited with the liquid in the main A, and is carried with the former to the lower compartment of the chamber B, and, inasmuch as the particles of tar are of like character, they cohere and sink gradually, and thence flow out with the displaced liquid through the valve F. Meanwhile the gas, being distributed throughout the liquid, and being forced through the latter, is brought in intimate contact with the volatile oils, and whatever carbonizing effect such contact can exert upon the gas is given thereto, and its candle-power proportionally increased. As the gas rises from the liquid it passes into the space immediately below the partition $b$, and thence through the pipe G to the tank I, wherein the temperature is such as to condense whatever aqueous vapor may remain in the gas; which done, the gas passes through the outlet-pipe G* to the gasometer, either with or without any intermediate purifying adjunct.

The process, as herein described, will secure the tar by the law of cohesion; the ammonia by solution in the aqueous vapor, condensed; the acids uniting with the base in the form of ammonia, as a per alkali; thereby employing all the liquid products of the gas-making material for the purification of its own vapor; the tar being disposed of by cohesion, the ammonia by solution in the condensed aqueous vapor, which is fixed by the action of the carbonic and sulphurous acids from the gas-making material.

What I claim as my invention is—

1. The process herein described of purifying illuminating-gas, by causing it to pass through liquids which flow forward from the destructive distillation of coal, oils, or other gas-making materials, substantially as herein specified.

2. The chamber B, constructed with the horizontal partition $b$ and the dip-tubes $c$, in combination with the pipes C and D and the main A, substantially as and for the purpose specified.

3. The combination, with the chamber B, constructed and operating as set forth, of the tank I, substantially as and for the purpose specified.

4. The combination, with the main A and chamber B, constructed and operating as described, of the exhauster E, arranged to serve the double purpose of withdrawing the gas from the main and forcing it through the dip-tubes $c$ of the chamber, substantially as herein set forth.

WM. H. ST. JOHN.

Witnesses:
THOS. E. CUFF,
S. O. ROCKWELL.